(12) United States Patent
Kamisoyama

(10) Patent No.: US 7,264,361 B2
(45) Date of Patent: Sep. 4, 2007

(54) ELECTRIC APPARATUS

(75) Inventor: Shinichi Kamisoyama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 365 days.

(21) Appl. No.: 10/870,586

(22) Filed: Jun. 17, 2004

(65) Prior Publication Data

US 2004/0257542 A1    Dec. 23, 2004

(30) Foreign Application Priority Data

Jun. 20, 2003  (JP)  ............................ P2003-176144

(51) Int. Cl.
*G03B 21/14* (2006.01)
*G02B 27/02* (2006.01)

(52) U.S. Cl. ...................... 353/119; 359/441

(58) Field of Classification Search ........ 359/441–442, 359/802; 353/119, 122; 349/56–57
See application file for complete search history.

(56) References Cited

U.S. PATENT DOCUMENTS

| | | | | |
|---|---|---|---|---|
| 2,697,963 A * | 12/1954 | Fink | ............................ | 353/41 |
| 4,163,615 A * | 8/1979 | Kwasman | ..................... | 356/39 |
| 5,703,727 A * | 12/1997 | Lawson et al. | ............. | 359/802 |
| 6,115,195 A * | 9/2000 | Winters | ...................... | 359/802 |
| 6,658,167 B1 * | 12/2003 | Lee et al. | ................... | 382/305 |
| 6,808,208 B2 * | 10/2004 | Ward | ........................... | 281/31 |
| 2003/0011897 A1* | 1/2003 | Knipping et al. | ........... | 359/802 |
| 2003/0234988 A1* | 12/2003 | Wang | ......................... | 359/802 |
| 2004/0207935 A1* | 10/2004 | Jim | ............................ | 359/802 |

FOREIGN PATENT DOCUMENTS

| JP | 64-13028 | 1/1989 |
|---|---|---|
| JP | 06-250101 | 9/1994 |
| JP | 2002-300250 | 11/2002 |

OTHER PUBLICATIONS

Office Action dated Feb. 13, 2007 issued by the Japanese Patent Office in Japanese Patent Application No. 2003-276144, with English translation, 4 pages.

* cited by examiner

*Primary Examiner*—Christopher Mahoney
(74) *Attorney, Agent, or Firm*—Osha Liang LLP

(57) ABSTRACT

An electric apparatus has an enlarging display unit including a lens portion corresponding to a screen of a liquid crystal display that is a display part of the electric apparatus, and a slide portion attached on a frame portion and moving up or down the lens portion without steps. A distance from the lens portion to the display part is adjustable.

13 Claims, 5 Drawing Sheets

ELECTRIC APPARATUS

BACKGROUND OF THE INVENTION

1. Field of the Invention

The present invention relates to an electric apparatus, and more particularly to an enlarging display unit to be mounted on, for example, a screen of a liquid crystal display that is a display part of a laser printer, for enlarging the display part so that the display part can be easily seen when operating the electric apparatus such as the laser printer, especially for enlarging in a continuous manner.

2. Description of the Related Art

Generally, a liquid crystal display is employed for a display part for displaying an operation method for operating an electric apparatus such as laser printer, or an error message.

In such liquid crystal display, displayed characters are small due to a limitation on the size, and it was difficult for the aged or weak-sighted person to view such small characters, producing an operational error. Furthermore, since it is required that this kind of electric apparatus is reduced in the size and weight, this tendency of operational error was still more remarkable.

By the way, in view of the above-mentioned problems, a conventional enlarging display unit comprises a liquid crystal panel secured to a main body, a magnifying lens disposed in parallel to the liquid crystal panel, a support shaft for supporting the magnifying lens to be movable up or down with respect to the main body, engaging means for engaging with the support shaft to support the magnifying lens at a plurality of positions, urging means for urging the engaging means in a direction to be engaged with the support shaft, and engagement releasing means for releasing engagement of the engaging means with the support shaft against the urging means (e.g., refer to JP-UM-A-64-13028).

SUMMARY OF THE INVENTION

However, in the constitution of JP-UM-A-64-13028, the support shaft is provided with a plurality of notches to support the magnifying lens at a plurality of positions. Naturally, the enlargement ratio of the lens is changed in steps according to the notches, resulting in a problem that any enlargement ratio cannot be set as desired by the operator. Also, there is another problem that the constitution is very complex because the urging means and the engagement releasing means are formed employing a coil spring or a plate spring.

This invention has been achieved to solve the above-mentioned problems, and it is an object of the invention to provide an electric apparatus with very simple constitution, and comprising an enlarging display unit capable of adjusting the enlargement ratio without steps and simply as desired by the operator.

In order to accomplish the above object, a first aspect of the invention provides an electric apparatus comprising: an enlarging display unit which is detachably mounted on a display part of the electric apparatus; wherein the enlarging display unit comprises: a lens portion corresponding to a screen of a liquid crystal display that is the display part of the electric apparatus; a slide portion having a tapered slide side and moving up or down the lens portion without steps; an operating rod including an operation shaft, a pulley-like lift portion disposed at one end of the operation shaft to slide on the slide side of the slide portion and a knob disposed at the other end of the operation shaft; and a frame body having a guide groove for guiding the vertical movement of the slide portion and a through hole through which the operation shaft of the operating rod is fitted; and wherein a distance from the lens portion to the display part is adjustable by causing the lift portion to be moved to left or right along with a left or right movement of the operation shaft.

With this constitution, since the enlargement ratio of the screen of the liquid crystal display that is the display part of the electric apparatus is adjusted without steps very simply only by operating the operating rod, the enlargement ratio suitable for the operator who operates the electric apparatus can be set up. Besides, since the enlarging display unit is detachably mounted, it is unnecessary to specifically deal with the electric apparatus that is the main unit. Accordingly, the enlarging display unit is readily employed for the existent electric apparatus, only if the enlarging display unit is prepared.

A second aspect of the invention provides an electric apparatus comprising: an enlarging display unit which is detachably mounted on the electric apparatus; wherein the enlarging display unit comprises: a lens portion corresponding to a screen of a liquid crystal display that is a display part of the electric apparatus; and a slide portion attached on a frame body and moving up or down the lens portion without steps; and wherein a distance from the lens portion to the display part is adjustable.

With this constitution, since the enlargement ratio of the screen of the liquid crystal display that is the display part of the electric apparatus is adjusted without steps, the enlargement ratio suitable for the operator who operates the electric apparatus can be set up. Besides, since the enlarging display unit is detachably mounted, it is unnecessary to specifically deal with the electric apparatus that is the main unit. Accordingly, the enlarging display unit is readily employed for the existent electric apparatus, only if the enlarging display unit is prepared.

A third aspect of the invention provides an electric apparatus comprising: an enlarging display unit which is detachably mounted on a display part of the electric apparatus; wherein the enlarging display unit comprises: a lens portion corresponding to a screen of a liquid crystal display that is the display part of the electric apparatus; a slide portion having a tapered slide side and moving up or down the lens portion without steps; an operating rod including an operation shaft having an external thread portion on a circumference thereof, a lift portion having an internal thread portion engaging with the external thread portion and a rotational operating handle provided at an end of the operation shaft; a frame body having a guide groove for guiding the vertical movement of the slide portion and a through hole through which the operation shaft of the operating rod is fitted; and wherein a distance from the lens portion to the display part is adjustable by causing the lift portion to be moved to left or right along with a rotation of the operation shaft.

With this constitution, since the enlargement ratio of the screen of the liquid crystal display that is the display part of the electric apparatus is adjusted without steps very simply only by operating the operating rod, the enlargement ratio suitable for the operator who operates the electric apparatus can be set up. Besides, since the enlarging display unit is detachably mounted, it is unnecessary to specifically deal with the electric apparatus that is the main unit. Accordingly, the enlarging display unit is readily employed for the existent electric apparatus, only if the enlarging display unit is prepared.

According to a fourth aspect of the invention, the lens portion and the slide portion are integrally formed by synthetic resin in such a way that the lens portion is placed on one leg of a piece in the shape of an L-character in cross section and the slide portion on the other leg.

With this constitution, since the lens portion and the slide portion are integrally formed, the number of parts is lessened and the number of assembling steps is reduced, whereby the electric apparatus is preferably cheaper.

According to a fifth aspect of invention, the friction factor between the through hole formed through the frame body and the operation shaft is made greater.

With this constitution, the positioning of the operating rod is preferably very stable in adjusting the enlargement ratio.

According to a sixth aspect of the invention, a rubber is attached on an inner face of the through hole formed through the frame body.

With this constitution, since the rubber is attached on the inner face of the through hole, the positioning of the operating rod is preferably very stable in adjusting the enlargement ratio.

DETAILED DESCRIPTION OF THE PREFFERED EMBODIMENTS

A preferred embodiment of the present invention will be described below with reference to FIGS. 1 to 7.

Figure 1:
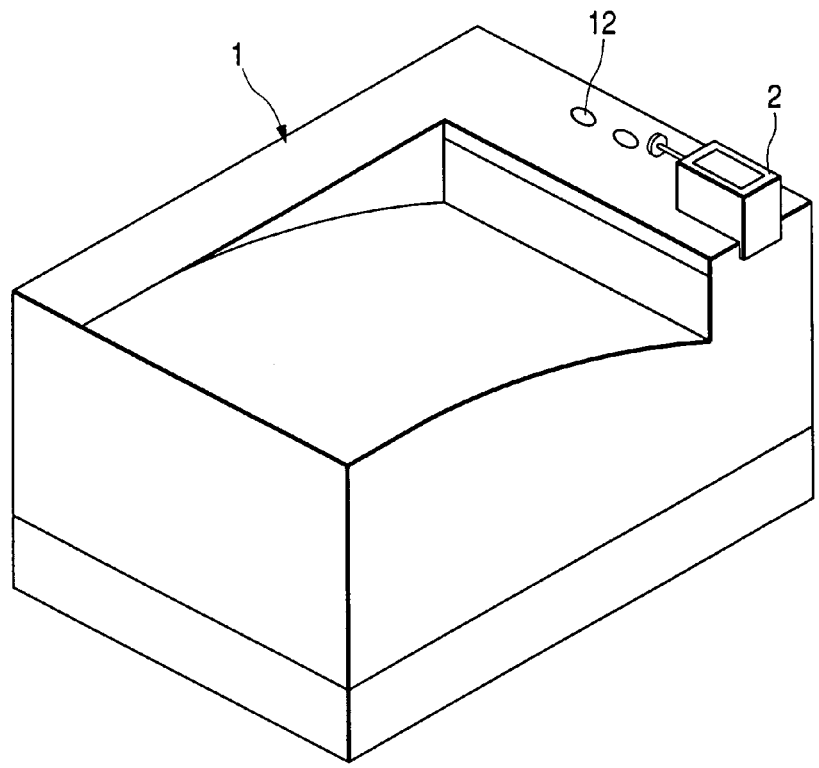
FIG. 1 is a perspective view showing a schematic constitution of an electric apparatus as a laser printer according to one embodiment of the present invention.
Figure 2:
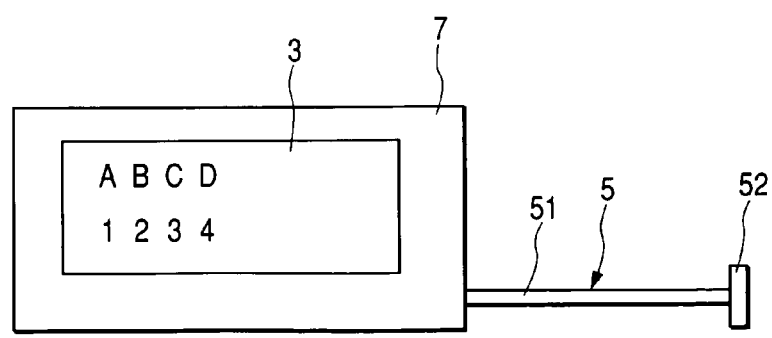
FIG. 2 is an upper view showing s schematic constitution of an enlarging display unit detachably mounted in the electric apparatus as shown in FIG. 1.
Figure 3:
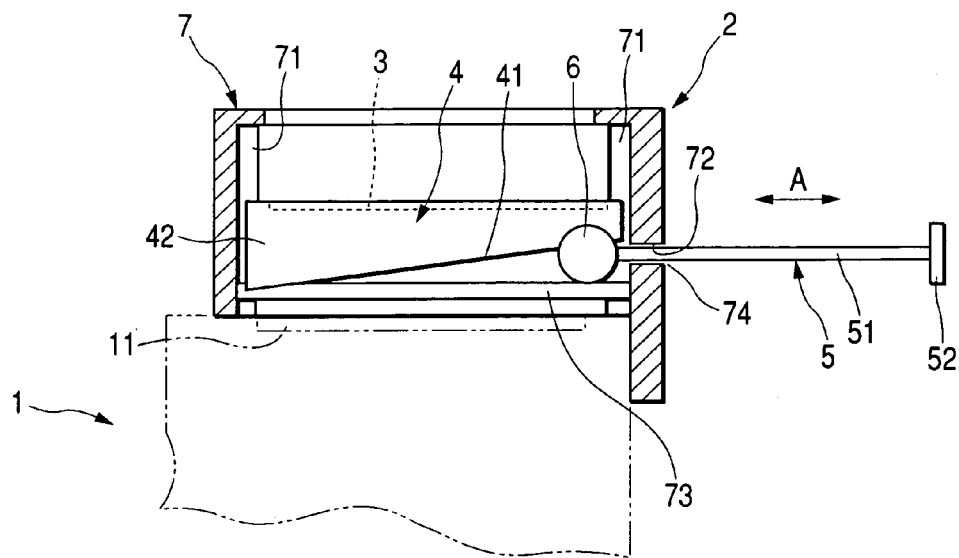
FIG. 3 is a front view, partly in cross section, showing the schematic constitution of the enlarging display unit as shown in FIG. 2 in a state where sn enlargement ratio is near the minimum.
Figure 4:
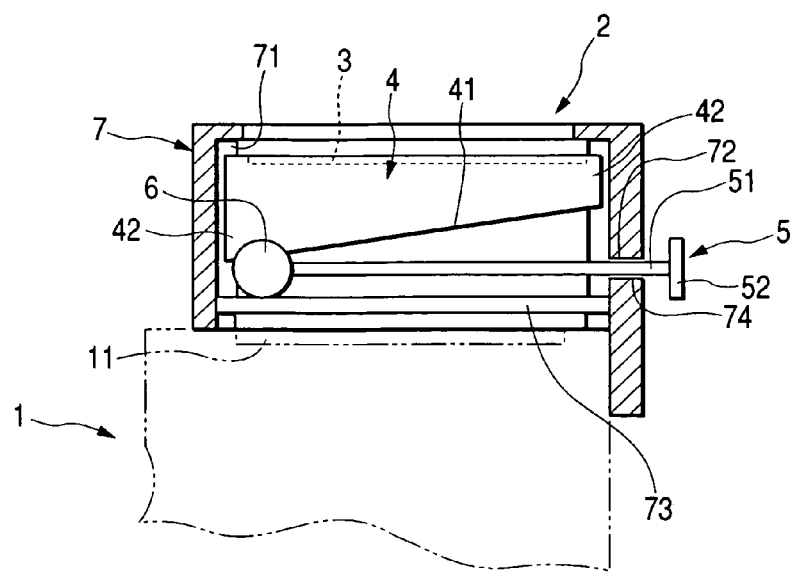
FIG. 4 is a front view, partly in cross section, showing the schematic constitution of the enlarging display unit as shown in FIG. 2 in a state where the enlargement ratio is near the maximum.
Figure 5:
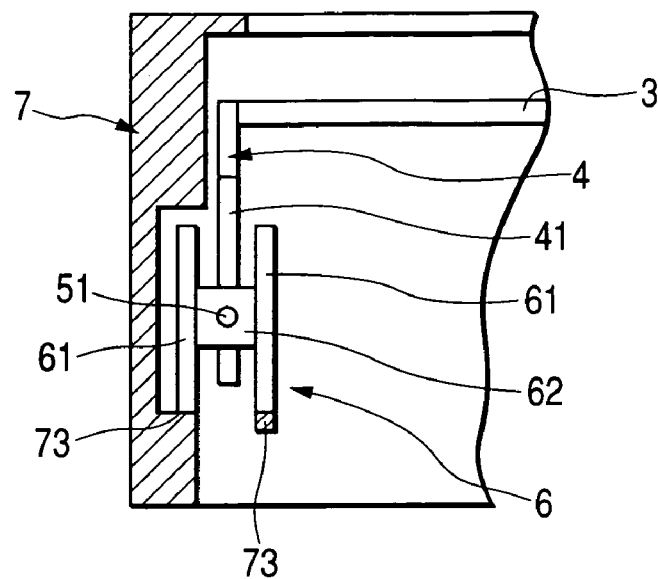
FIG. 5 is an enlarged cross-sectional side view showing a part of the enlarging display unit as shown in FIG. 2.
Figure 6:
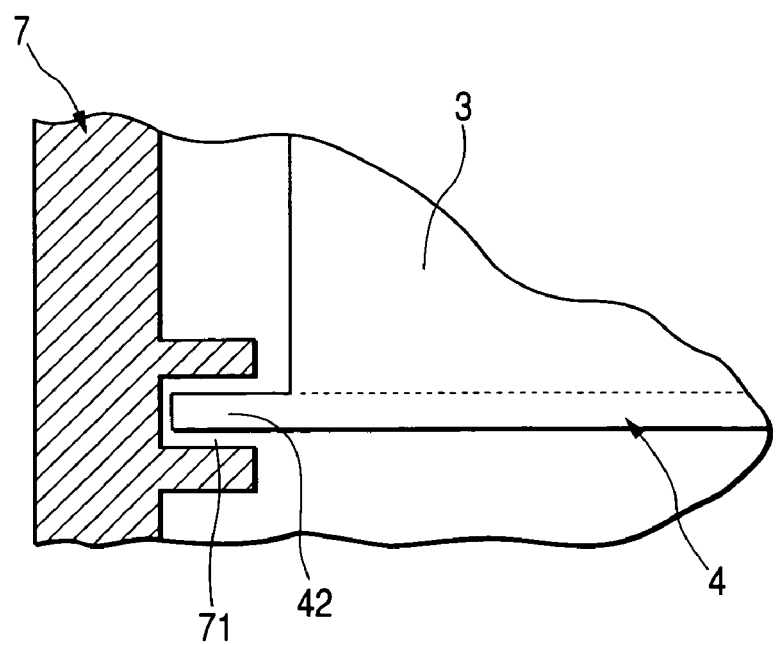
FIG. 6 is an enlarged cross-sectional view showing a part of the enlarging display unit as shown in FIG. 2.
Figure 7:
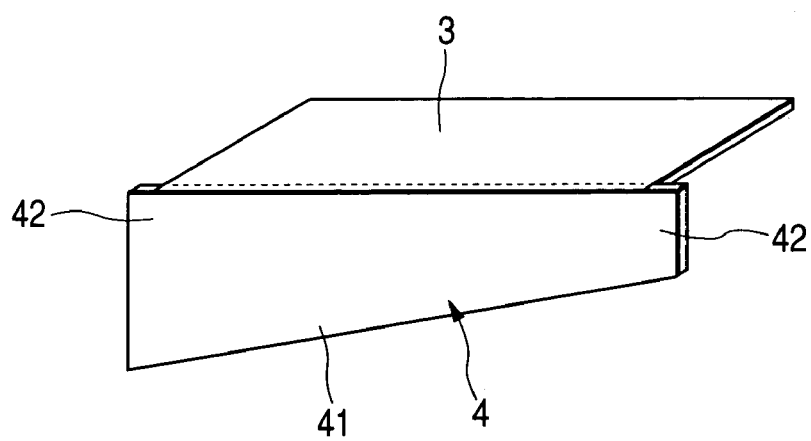
FIG. 7 is a perspective view showing an example in which a lens portion and a slide portion are integrally molded.

FIG. 1 is a perspective view showing the schematic constitution of an electric apparatus as a laser printer according to one embodiment of the invention. FIG. 2 is an upper view showing the schematic constitution of an enlarging display unit detachably mounted as shown in FIG. 1. FIGS. 3 and 4 are front views, partly in cross section, showing the schematic constitution of the enlarging display unit of FIG. 2 in a state where the enlargement ratios are near the minimum and near the maximum, respectively. FIG. 5 is a side view, partly in cross section, showing in enlargement a part of the enlarging display unit as shown in FIG. 2. FIG. 6 is a cross-sectional view of the essence showing in enlargement a part of the enlarging display unit as shown in FIG. 2. FIG. 7 is a perspective view showing an example in which a lens portion and a slide portion are integrally molded.

Reference numeral 1 denotes an electric apparatus such as a laser printer, in which a display part 11 including a liquid crystal display for displaying an operation method and an error message is provided on an upper face of its main body. Reference numeral 12 denotes an operation button for operating the electric apparatus, and 2 denotes an enlarging display unit detachably mounted on a front face of the display part 11 by a pressure sensitive adhesive double coated tape, a magic tape, or screw or engaging means.

The enlarging display unit 2 comprises a lens portion 3 composed of a well-known Fresnel lens of flat plate type, for example, corresponding to the screen of the display part 11 composed of the liquid crystal display in the electric apparatus 1, and a tapered slide side 41. The enlarging display unit 2 further comprises a slide portion 4 supporting the lens portion 3 and moving up or down the lens portion without steps, an operating rod 5 having a pulley-like lift portion 6 fitted to slide on the slide side 41 of the slide portion at one end of an operation shaft 51 and a knob 52 at the other end, and a frame body 7 having a guide groove 71 for guiding the vertical movement of the slide portion 4 by having the end portion 42 of the slide portion 4 being fitted into the frame body, and a through hole 72 through which the operation shaft 51 of the operating rod 5 is fitted.

The pulley-like lift portion 6 is provided with a cylindrical linkage shaft 62 between one pair of wheels 61-61, the slide side 41 of the slide portion 4 is fitted between the wheels 61-61, the slide side 41 is contact with an upper face of the cylindrical linkage shaft 62, and the wheels 61 are movable to the left or right (see the arrow A in FIG. 3) on a rail 73 formed on the frame body 7, as shown in FIG. 5.

The operation of the enlarging display unit 2 constituted above will be now described. The enlarging display unit 2 is detachably mounted by a pressure sensitive adhesive double coated tape, for example, on the front face of the display part 11 in the electric apparatus 1. If the operating rod 5 is moved from the right to the left side on the paper face in FIG. 3, taking the knob 52 of the operating rod 51, the lift portion 6 is moved in the left direction on the rail 72 along with the left movement of the operating rod 5, and a contact position between the upper face of the linkage shaft 62 in the lift portion 6 and the tapered slide side 41 is shifted successively to the left, so that the slide portion 4 rises while being guided by the guide groove 71. Accordingly, the lens portion 3 supported by the slide portion 4 rises to increase the distance from the lens portion 3 to the display part 11, thereby adjusting the enlargement ratio, as shown in FIG. 4.

In the above embodiment, the enlargement ratio of the screen of the liquid crystal display that is the display part 11 of the electric apparatus 1 can be adjusted without steps very simply only by operating the operating rod 5. Hence, the enlargement ratio suitable for the operator who operates the electric apparatus 1 can be set up. Besides, since the enlarging display unit 2 is detachably mounted, it is unnecessary to specifically deal with the electric apparatus 1 that is the main unit. Accordingly, the enlarging display unit 2 is readily employed for the existent electric apparatus 1, only if the enlarging display unit 2 is prepared.

The lens portion 3 and the slide portion 4 may be integrally formed by synthetic resin in such a way that the lens portion 3 is placed on one leg of a piece having the shape of an L-character in cross section and the slide portion 4 on the other leg, as shown in FIG. 7. In this way, since the lens portion and the slide portion are integrally formed, the number of parts is lessened and the number of assembly steps is reduced, whereby the apparatus is preferably cheaper.

Also, to increase the friction factor between the through hole 72 formed through the frame body 7 and the operation shaft 51, a rubber 74 may be bonded on an inner face of the through hole 72, for example. In this way, when the enlargement ratio is adjusted by operating the operating rod 5, an adequate friction is obtained, and the positioning becomes advantageously very stable.

Figure 8:
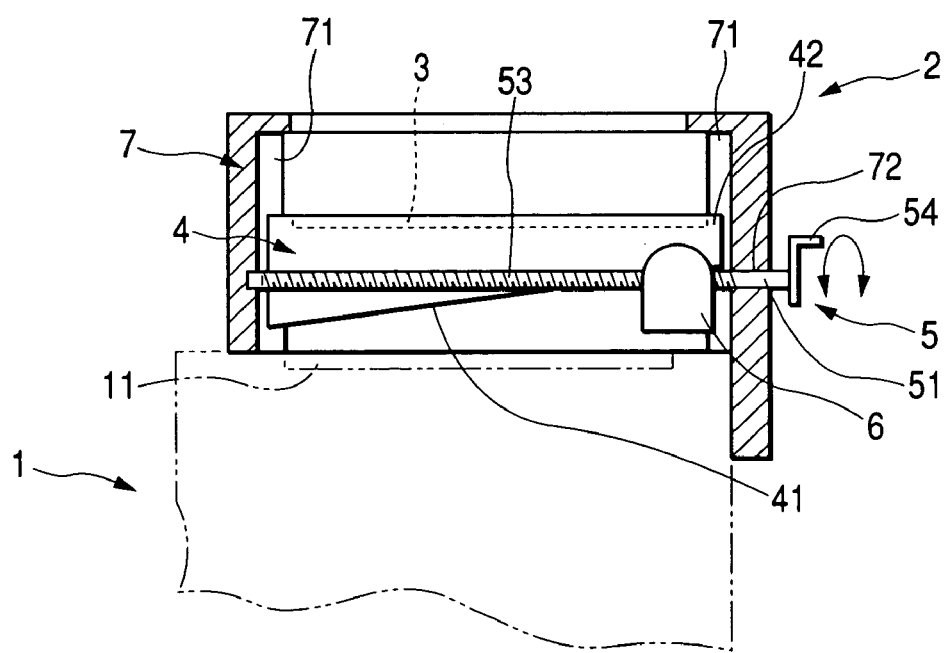
FIG. 8 is a front view, partly in cross section, showing a schematic constitution of an enlarging display unit according to another embodiment of the invention in a state where an enlargement ratio is near the minimum.
Figure 9:
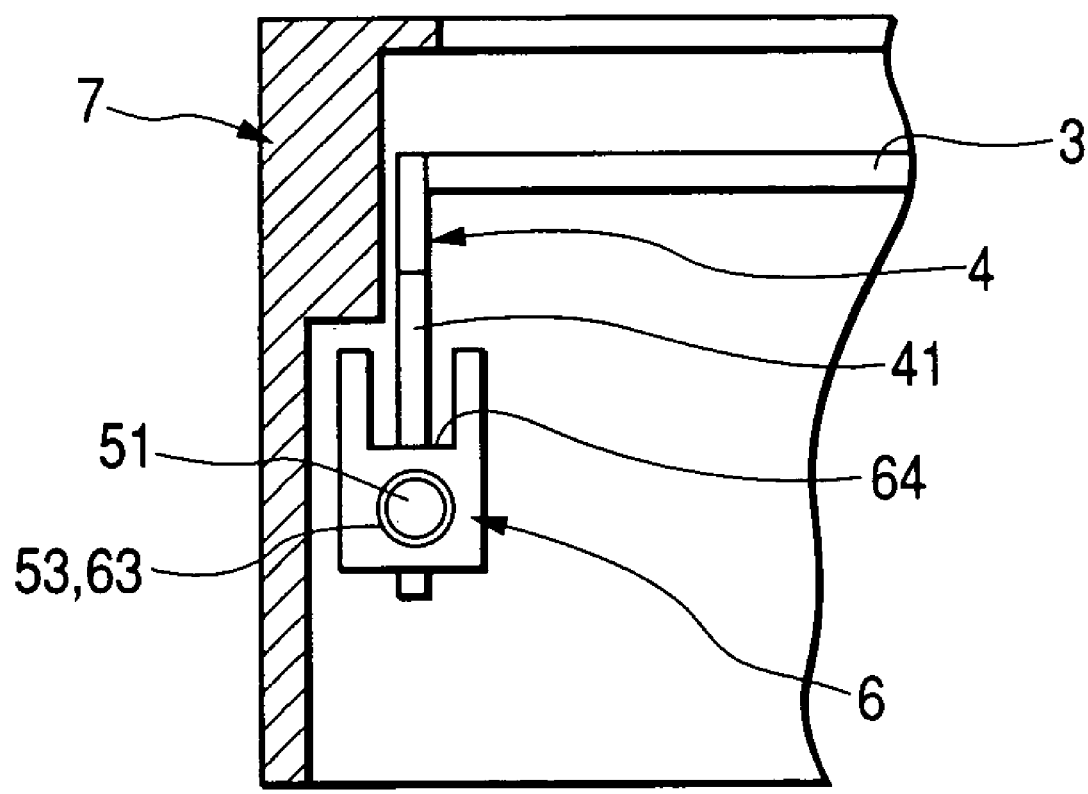
FIG. 9 is an enlarged cross-sectional side view showing a part of the enlarging display unit as shown in FIG. 8.

Referring to FIGS. 8 and 9, another embodiment of the invention will be now described. The same or like parts are designated by the same numerals throughout FIGS. 1 to 8. The different points are principally described.

FIG. 8 is a front view, partly in cross section, showing the schematic constitution of an enlarging display unit according to another embodiment of the invention in a state where the enlargement ratio is near the minimum. FIG. 9 is a cross-sectional side view showing in enlargement a part of the enlarging display unit as shown in FIG. 8.

In this embodiment, the operating rod 5 is rotary, in which an external thread portion 53 is formed on the circumference of the operation shaft 51, one end of this operation shaft 51 being engaged in a bearing, not shown, to be rotatable with the frame body 7, and the other end being passed through the through hole 72 out of the frame body 7. A rotational operating handle 54 is provided at an end portion of the operation shaft, whereby the operating rod 51 is rotated in a positive or reverse direction along with the rotation of this operating handle 54. The operating rod 5 is provided with the lift portion 6 through which the operation shaft 51 of the operating rod 5 is passed, and having an internal thread portion 63 engaging the external thread portion 53. The slide side 41 of the slide portion 4 is fitted with the lift portion 6 to contact the upper face of a concave portion 64 of the lift portion 6 as in the previous embodiment.

The operation of the enlarging display unit 2 constituted above will be now described. If the operating handle 54 of the operating rod 5 is rotated, the operation shaft 51 is corresponding rotated as in the previous embodiment. The lift portion 6 having the internal thread portion 63 engaging the external thread portion 53 is moved in the left direction, when the operation shaft 51 is rotated clockwise, for example. Along with this movement, a contact position between the upper face of the concave portion 64 for the lift portion 6 and the tapered slide side 41 is moved successively to the left, so that the slide portion 4 rises while being guided by the guide groove 71. Accordingly, the lens portion 3 supported by the slide portion 4 rises to increase the distance from the lens portion 3 to the display part 11, thereby adjusting the enlargement ratio.

In this embodiment, like the previous embodiment, the enlargement ratio of the screen of the liquid crystal display that is the display part 11 of the electric apparatus 1 is adjusted without steps very simply only by rotating the operating rod 5. Hence, the enlargement ratio suitable for the operator who operates the electric apparatus 1 can be set up. Since the enlarging display unit 2 is detachably mounted, it is unnecessary to specifically deal with the electric apparatus 1 that is the main unit. Accordingly, the enlarging display unit 2 is readily employed for the existent electric apparatus 1, only if the enlarging display unit 2 is prepared. Moreover, since it is not required to move the operating rod 5 to the left or right, in contrast to the previous embodiment, there is the effect that the size of the apparatus is reduced.

The invention is not limited to the above-described embodiments, although they are preferred embodiments in this invention. In addition, various variations or modifications may be made without departing from the spirit of scope of the invention.

As described above, with the first aspect of the invention, since the enlargement ratio of the screen of the liquid crystal display that is the display part of the electric apparatus is adjusted very simply without steps only by operating the operating rod, the enlargement ratio suitable for the operator who operates the electric apparatus can be set up. Besides, since the enlarging display unit is detachably mounted, it is unnecessary to specifically deal with the electric apparatus that is the main unit. Accordingly, there is the effect that the enlarging display unit is readily employed for the existent electric apparatus, only if the enlarging display unit is prepared.

Also, with the second aspect of the invention, since the enlargement ratio of the screen of the liquid crystal display that is the display part of the electric apparatus is adjusted without steps, the enlargement ratio suitable for the operator who operates the electric apparatus can be set up. Besides, since the enlarging display unit is detachably mounted, it is unnecessary to specifically deal with the electric apparatus that is the main unit. Accordingly, there is the effect that the enlarging display unit is readily employed for the existent electric apparatus, only if the enlarging display unit is prepared.

Also, with the third aspect of the invention, since the enlargement ratio of the screen of the liquid crystal display that is the display part of the electric apparatus is adjusted without steps very simply only by operating the operating rod, the enlargement ratio suitable for the operator who operates the electric apparatus can be set up. Besides, since the enlarging display unit is detachably mounted, it is unnecessary to specifically deal with the electric apparatus that is the main unit. Accordingly, there is the effect that the enlarging display unit is readily employed for the existent electric apparatus, only if the enlarging display unit is prepared.

Also, with the fourth aspect of the invention, since the lens portion and the slide portion are integrally formed, the number of parts is lessened and the number of assembling steps is reduced, whereby the electric apparatus is preferably cheaper.

Also, with the fifth aspect of the invention, the positioning of the operating rod is preferably very stable in adjusting the enlargement ratio.

Also, with the sixth aspect of the invention, since the rubber is attached on the inner face of the through hole, the positioning of the operating rod is preferably very stable in adjusting the enlargement ratio.

What is claimed is:

1. An electric apparatus comprising:
   an enlarging display unit which is detachably mounted on a display part of the electric apparatus;
   wherein the enlarging display unit comprises:
   a lens portion corresponding to a screen of a liquid crystal display that is the display part of the electric apparatus;
   a slide portion having a tapered slide side and moving up or down the lens portion without steps;
   an operating rod including an operation shaft, a pulley-like lift portion disposed at one end of the operation shaft to slide on the slide side of the slide portion and a knob disposed at the other end of the operation shaft; and a frame body having a guide groove for guiding the vertical movement of the slide portion and a through hole through which the operation shaft of the operating rod is fitted; and wherein a distance from the lens portion to the display part is adjustable by causing the lift portion to be moved to left or right along with a left or right movement of the operation shaft.

2. The electric apparatus according to claim 1, wherein the lens portion and the slide portion are integrally formed of a synthetic resin in such a way that the lens portion and the slide portion are connected in the shape of an L-character in cross section.

3. The electric apparatus according to claim 1, wherein a rubber is attached on an inner face of the through hole formed through the frame body so that a friction factor between the through hole and the operation shaft is increased.

4. An electric apparatus comprising:
an enlarging display unit which is detachably mounted on the electric apparatus;
wherein the enlarging display unit comprises:
a frame body;
a lens portion corresponding to a screen of a liquid crystal display that is a display part of the electric apparatus;
a slide portion attached on a frame body and moving up or down the lens portion without steps; and
a lift portion, being movable along the slide portion, and operable to adjust a distance from the lens portion to the display part in accordance with the movement thereof.

5. The electric apparatus according to claim 4, wherein the slide portion comprises a tapered slide side along which the lift portion moves.

6. The electric apparatus according to claim 5, further comprising an operating rod attached to the lift portion.

7. An electric apparatus comprising:
an enlarging display unit which is detachably mounted on a display part of the electric apparatus;
wherein the enlarging display unit comprises:
a lens portion corresponding to a screen of a liquid crystal display that is the display part of the electric apparatus;
a slide portion having a tapered slide side and moving up or down the lens portion without steps;
an operating rod including an operation shaft having an external thread portion on a circumference thereof, a lift portion having an internal thread portion engaging with the external thread portion and a rotational operating handle provided at an end of the operation shaft;
a frame body having a guide groove for guiding the vertical movement of the slide portion and a through hole through which the operation shaft of the operating rod is fitted; and
wherein a distance from the lens portion to the display part is adjustable by causing the lift portion to be moved to left or right along with a rotation of the operation shaft.

8. The electric apparatus according to claim 7, wherein the lens portion and the slide portion are integrally formed of a synthetic resin in such a way that the lens portion and the slide portion are connected in the shape of an L-character in cross section.

9. The electric apparatus according to claim 7, wherein a rubber is attached on an inner face of the through hole formed through the frame body so that a friction factor between the through hole and the operation shaft is increased.

10. An electric apparatus comprising:
an enlarging display unit which is detachably mounted on the electric apparatus;
wherein the enlarging display unit comprises:
a lens portion corresponding to a screen of a liquid crystal display that is a display part of the electric apparatus; and
a slide portion attached on a frame body and moving up or down the lens portion without steps; and
wherein a distance from the lens portion to the display part is adjustable wherein the lens portion and the slide portion are integrally formed of a synthetic resin in such a way that the lens portion and the slide portion are connected in the shape of an L-character in cross section.

11. An enlarging display unit, adapted to be detachably mounted on an electric apparatus, the enlarging display unit comprising:
a frame body;
a lens portion, adapted to be opposed to a display part of the electric apparatus;
a slide portion, attached on the frame body and operable to move up or down the lens portion without steps; and
a lift portion, being movable along the slide portion, and operable to adjust a distance from the lens portion to the display part in accordance with the movement thereof.

12. The enlarging display unit according to claim 11, further comprising:
an operating rod, coupled to the lift portion and attached to the frame body so as to be movable horizontally, wherein:
the frame body has a guide groove for guiding a vertical movement of the slide portion; and
the lift portion is movable horizontally in accordance with the horizontal movement of the rod shaft.

13. The enlarging display unit according to claim 11, further comprising:
an operation rod, having a first thread portion formed on an outer periphery of the operation rod, and attached to the frame body so as to be rotatable about an axis thereof, wherein:
the frame body has a guide groove for guiding a vertical movement of the slide portion;
the lift portion is formed with a second thread portion being engaged with the first thread portion; and
the lift portion is movable horizontally in accordance with the rotation of the operation rod.

* * * * *